Figure 1:
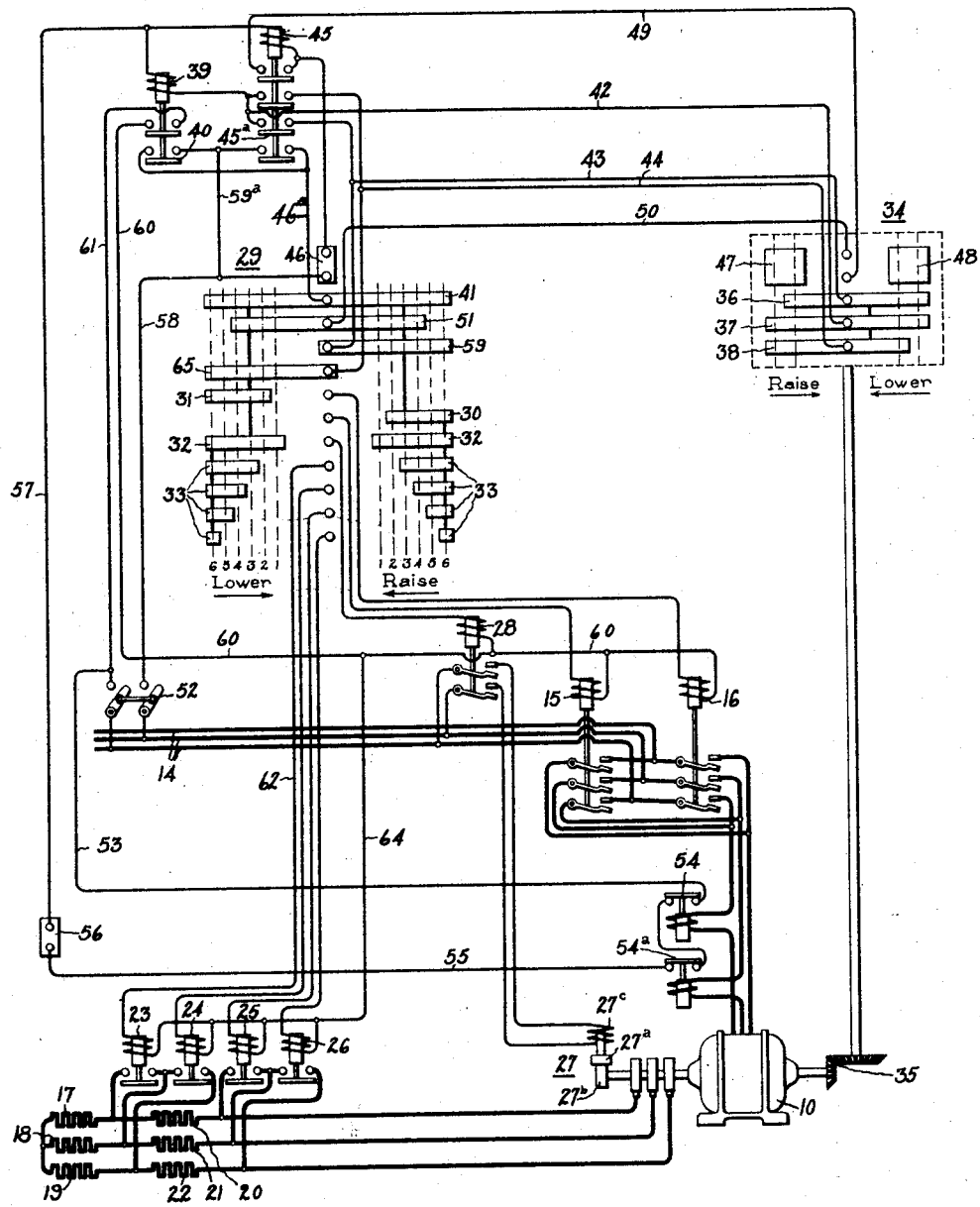

March 14, 1933.  J. A. SETTER  1,901,672

MOTOR CONTROL SYSTEM

Filed Aug. 12, 1931

Inventor:
Joseph A. Setter,
by Charles E. Tullar.
His Attorney.

Patented Mar. 14, 1933

1,901,672

UNITED STATES PATENT OFFICE

JOSEPH A. SETTER, OF SCHENECTADY, NEW YORK, ASSIGNOR TO GENERAL ELECTRIC COMPANY, A CORPORATION OF NEW YORK

MOTOR CONTROL SYSTEM

Application filed August 12, 1931. Serial No. 556,599.

This invention relates to motor control systems, more particularly to systems in which the motor is operated between predetermined limits of operation and it has for an object the provision of means for insuring the disconnection and stopping of the motor prior to operation beyond these limits at reduced power and speed.

More specifically the invention relates to motor control systems in which an electric motor is employed to operate a load body in either direction between predetermined limits short of the final position, and a further object of the invention is the disconnection of the motor from the line prior to operation beyond these limits at reduced power and speed so that the load body is operated to its final position without shock or jar.

The invention has particular utility in its application to control systems for reversible electric motors employed to operate load bodies or devices having a limited movement such for example as bascule bridges and the like. Although the invention is particularly advantageous in its application to systems for controlling the operation of motors employed to operate bascule bridges, it will be understood that the invention has other application and that reference to its application to bascule bridges is made primarily for the purpose of illustrating the operation of the system.

The inertia and momentum of a bascule bridge is very great and it frequently happens in the operation of these bridges that the speed of movement of the bridge leaf is not sufficiently reduced as it approaches the final closed or open position, the result of which is that the leaf is seated with such a severe shock as to cause a rebound of from several inches to a foot from the seated position before finally coming to rest with perhaps the bridge slightly open. Many of these bridges are several hundred feet long and weigh many tons. Consequently severe shocks of this nature are to be avoided since they set up in the members of the bridge severe stresses which the members are not intended and not designed to withstand, with the attendant possibility of collapse of the entire structure.

This invention seeks to avoid the difficulties and the possibilities of damage by insuring disconnection and stopping of the bridge operating motor when the bridge leaf reaches a predetermined nearly opened or nearly closed position, prior to further operation of the motor to seat this bridge in its final position.

In carrying the inventon into effect in one form thereof, a limit switch mechanism is provided for stopping the motor at a predetermined limit of operation, preferably at a point corresponding to a point in the movement of the bridge close to the final seated position, and means are provided for operating the motor beyond this limit at reduced speed and torque together with means for insuring the disconnection and stopping of the motor prior to such operation beyond this limit to seat the bridge.

In illustrating the invention in one form thereof, it is shown, for the sake of simplicity, as embodied in a control system for a motor arranged and employed to operate a single leaf bascule bridge, although it will be clear that the invention may be applied to motors employed to operate double leaf or lift bridges and as pointed out above, the invention has utility in applications other than to bridges.

Figure 2:
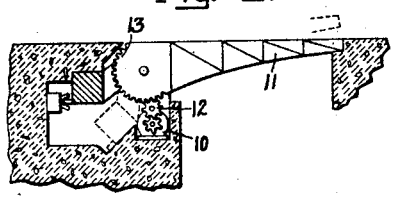

For a better and more complete understanding of the invention reference should now be had to the following specification and to the accompanying drawing in which Fig. 1 is a simple, diagrammatical illustration of an embodiment of the invention, and Fig. 2 is a simple diagrammatical sketch illustrating the arrangement of the driving motor in an application of the invention to a bascule bridge.

Referring now to the drawing, an electric motor 10 is employed to operate the leaf 11 of a bascule bridge between the open and the closed position which the leaf is shown as occupying in the drawing. The motor 10 is arranged in a suitable position with respect to the leaf of the bridge, preferably in the counterweight pit, and its drive shaft is connected through suitable reduction gearing 12 to the rack 13 arranged on the counterweight end of leaf 11.

Although the motor 10 may be of any suitable type, it is illustrated as an alternating current motor of the wound rotor induction type, and as being supplied from any suitable source such for example as that represented in the drawing by the three supply lines 14 to which the primary terminals of the motor are arranged to be connected for rotation in either direction by means of the reversing contactors 15 and 16 respectively.

A suitable current limiting device, shown in the drawing as a plurality of separate resistance sections 17, 18, 19, 20, 21 and 22 is connected to the secondary terminals of the motor 10 and the inclusion of this current limiting device in the rotor circuit of the motor and its exclusion therefrom is effected by means of a plurality of electromagnetic switching devices 23, 24, 25 and 26.

When the motor 10 is not in operation, it is held at rest by any suitable braking means, such for example as the solenoid brake 27, the brake shoe $27_a$ of which is normally biased by means of a spring (not shown) into engagement with a brake drum $27_b$ which is keyed to the drive shaft of the motor 10. The release of the brake is effected by means of a brake contactor 28 which when operated to its closed position serves to connect the brake solenoid $27_c$ to the supply source 14 and to energize the brake solenoid so as to withdraw the brake shoe $27_a$ from engagement with the brake drum $27_b$.

The operation of the reversing contactors 15 and 16, the accelerating contactors 23–26 inclusive and the brake contactor 28 is controlled by any suitable means such for example as the master controller 29 shown in the drawing as a manually operated drum switch. The drum switch 29 is provided with segments 30 and 31 which respectively control the energization of the contactors 15 and 16 to provide for connection of the motor 10 to the source 14 for respectively raising and lowering the leaf 11 and the drum switch is further provided with segments 32 which control energization of the braking contactor 28, and it is also provided with a plurality of segments 33 which control the operation of the accelerating contactors 23, 24, 25 and 26.

Suitable limit switch mechanism 34 is mechanically connected to be driven either by the motor 10, preferably through suitable speed reduction gearing 35 or to the leaf 11 mechanism through suitable gearing. The limit switch mechanism 34 is illustrated as being of the drum switch type and is provided with upper, middle and lower segments 36, 37 and 38 respectively. The ratio of the speed reduction gearing 35 and the initial relative positions of the driving pinion and the driven gear thereof are so chosen that the segment 36 will be operated out of engagement with its cooperating stationary contact finger when the bridge leaf 11 reaches the nearly raised or nearly open limiting position whilst when operating in the opposite direction the segment 38 will be operated out of engagement with its cooperating stationary contact finger when the bridge leaf 11 reaches the nearly closed position illustrated in dotted lines in Fig. 2. Segments 47 or 48 close simultaneously with the opening of 36 or 38.

An under-voltage relay 39 of the conventional type is provided with a main movable contact member 40 which when operated to its closed position serves partially to establish energizing circuits for the reversing contactors 15, 16, the brake contactor 28 and the accelerating contactors 23–26 inclusive from the middle supply line 14 to the upper or main power segment 41 of the drum switch 29. The energization of the operating winding of the under-voltage relay 39 is controlled by the segments 36, 37 and 38 of the limit switch mechanism 34 through one or the other of the conductors 42, 43 or 44, depending upon the position of the bridge leaf 11, and thus it will be seen that the limit switch mechanism 34 serves to deenergize the under-voltage relay 39 and thus to stop the motor 10 and apply the brake when the leaf 11 is operated either to the nearly raised or nearly lowered position.

A suitable electroresponsive device, shown in the drawing as a control relay 45, serves to reestablish the energization of the under-voltage relay 39 upon operation of the drum switch 29 to its central or neutral position in which it is illustrated in the drawing. The energizing circuit of the special control relay 45 can only be completed through the segment 46 on the drum switch 29 when the latter is in its central or neutral position. Thus it will be seen that connections have been provided which require that the drum switch 29 be operated to its neutral or "off" position to disconnect the motor 10 from the supply source 14 and to insert the current limiting resistances in the rotor circuit of the motor before the under-voltage relay 39 can again be reenergized and operated to reestablish the energizing circuit for the reversing contactors 15 and 16 and the resistance controlling contactors 23—26 as far as the main power segment 41 of the drum switch 29.

The limit switch mechanism 34 is further provided with segments 47 and 48 which complete holding circuits for the special control relay 45 through conductors 49 and 50 when the bridge leaf 11 reaches and is in the nearly open or nearly closed position and thus the operation of the motor 10 may be continued beyond these limits to seat the bridge leaf 11 in its final position upon operation of the drum switch 29 to one of its intermediate power positions. In order that the motor 10 may be prevented from operating the bridge leaf 11 beyond the nearly open or nearly closed position to the final seated position at too great a speed, the drum switch 29 is provided with a special segment 51 included in the locking circuit of the special control relay 45 and of such dimensions that it interrupts the locking circuit of the control relay 45 if the drum switch 29 is operated beyond a predetermined low speed shown in the drawing as the third speed point on the controller.

Thus, it will be seen that connections have been provided which prevent the motor 10 from operating the bridge leaf 11 beyond the nearly closed or nearly open position prior to the operation of the drum switch 29 to the off position to disconnect and stop the motor 10 and it will also be seen that connections have been provided for the operation of the motor 10 to seat the bridge leaf 11 in its final position at a reduced speed thus insuring that the bridge leaf 11 will be seated substantially without shock or jar.

With the above understanding of the elements and connections and their organization in the control system, the operation of the system itself will readily be understood from the detailed description which follows. Assuming that the bridge leaf 11 is in the closed position in which it is illustrated in Fig. 2 of the drawing and that it is desired to open the bridge, the line switch 52 is first operated to the closed position in which it completes an energizing circuit for the special control relay 45 which circuit may be traced from the lower supply line 14 through the conductor 53, contacts of the overload relays 54 and 54$_a$ in their closed positions, conductor 55, auxiliary interlocking limit switch 56, conductor 57, operating winding of special control relay 45, segment 46 on the drum switch 29 in its off position and thence by conductor 58 to the middle supply line 14. Special control relay 45 in responding to the energization of its operating coil establishes an energizing circuit for under voltage relay 39; this circuit being traced to the conductor 57 as before and thence through the operating winding of the voltage relay 39, conductor 42, segments 36 and 37 of the limit switch mechanism 34, conductor 43, segments 59 and 41 of drum switch 29, lower contact of special control relay 45 in its closed position, conductor 59$_a$, and thence by conductor 58 to the middle supply line 14. In responding to the energization of its operating coil, under-voltage relay 39 moves to its upper position in which it closes its lower contacts 40 to establish a holding circuit for its coil independently of the lower contacts of the special control relay 45 and thus it will be seen that in the closed position of the under voltage relay 39 the middle supply line 14 is connected to the main power segments 41 of the drum switch 29 through the lower contact 40 of the relay.

The system is now in its normal prestarting position and the motor 10 may be started and accelerated to full running speed in a direction to raise the bridge leaf 11 by operating the master controlling drum switch 29 in a left hand direction from the off position in which it is shown through its successive operating positions represented in the drawings by the broken lines 1-6 inclusive.

Operation of the drum switch 29 to its first position completes an energizing circuit for the operating coil of the brake contactor 28 from the power segment 41 (which as previously pointed out is connected to the middle supply line 14) through segment 32 and its cooperating stationary finger, coil of brake contactor 28, conductor 60, upper contact of under-voltage relay 39 in the closed position and conductor 61 to the lower supply line 14. The brake contactor 28 in responding to the energization of its operating coil closes its main contacts to establish an energizing circuit for the brake solenoid 27$_c$ across the middle and lower supply conductors 14, thus withdrawing the brake shoe 27$_a$ from engagement from the brake drum 27$_b$ on the motor shaft. Upon operation of the drum switch 29 to its second operating position, an energizing circuit is completed for the directional contactor 15; this circuit being traced from the power segment 41 through segment 30 and its cooperating stationary finger to and through the operating coil of the directional contactor 15 and thence by way of conductors 60 and 61 to the lower supply conductor 14. Contactor 15 is operated to the closed position in response to the energization of its operating coil to connect the motor 10 to the supply source 14 for rotation in such a direction as to raise the bridge leaf 11 from the closed position in which it is shown, to the open position.

Due to the presence of the accelerating resistances 17-22 inclusive in the rotor circuit of the motor 10, the latter starts at a very slow speed. As the drum switch 29 is operated to its third operative position, the operating coil of the accelerating contactor 23 is energized over a circuit extending from power segment 41 of the drum switch 29 through the upper right-hand segment 33 and its cooperating stationary finger, conductor 62, operating coil of accelerating contactor 23, thence by way of conductors 64, 60 and 61 to the lower supply conductor 14. Contactor 23 in responding to the energization of its operating coil moves to the closed position in which it short circuits the resistance sections 17 and 18 thereby causing the speed of the motor 10 to be increased. The remaining sections 19, 20, 21 and 22 of the accelerating resistance are similarly short circuited by operating the drum switch 29 through its successive operating positions in which it successively completes energizing circuits for the operating coils of the accelerating contactors 24, 25 and 26; the energizing circuit for the last accelerating contactor 26 being completed as the drum switch 29 is moved into its sixth or final position. The speed of the motor 10 is increased as the successive resistance sections are short circuited and reaches its full value when the last section of the accelerating resistance is short circuited.

The motor 10 now drives the bridge leaf 11 toward the open position and as the leaf 11 reaches the nearly open limit the segment 36 of the limit switch mechanism 34 is operated out of engagement with its cooperating stationary finger thereby interrupting the energizing circuit of the under-voltage relay 39 which drops to its lower position in response to the deenergization of its coil. In its open position the relay 39 disconnects the power segment 41 of the drum switch 29 from the middle supply line 14 and since the energizing circuits for the directional contactor 15, the brake contactor 28 and the accelerating contactors 23–26 were traced from the power segment 41 to the lower supply line 14 it will be seen that these last mentioned contactors are all deenergized and operated to the open position when the limit switch 34 interrupts the energizing circuit of the under-voltage relay 39. In its open position the directional contactor 15 disconnects the motor 10 from the supply source 14 and the opening of the brake contactor 28 deenergizes the brake solenoid $27_c$ thus permitting the brake spring to set the brake shoe $27_a$ against the brake drum $27_b$ to bring the motor 10 to rest, whilst the accelerating contactors 23–26 inclusive in their open position serve to reinsert the accelerating resistances 17–22 inclusive in the rotor circuit of the motor 10.

From the foregoing description of the operation up to this point it will be seen that the limit switch mechanism 34 serves to stop the motor 10 when the bridge leaf 11 reaches the nearly open position. The operation of the motor 10 may be continued beyond the nearly open limit to seat the bridge leaf 11 in its final position; but this can be accomplished only by first operating the drum switch 29 to its central or neutral position in which the energizing circuits for the operating coils for the directional, brake and accelerating contactors are further interrupted at the control segments of the drum switch 29.

Upon operation of the drum switch 29 to its off position the energizing circuit for the operating coil of special control relay 45 is reestablished through the single point segment 46 and the relay in closing completes a holding circuit independent of segment 46 through its upper contacts, conductor 49, segments 47 of limit switch mechanism 34, conductor 50, segments 51 and 41, lower contact of relay 45 to conductor $59_a$ so that upon subsequent operation of the drum switch 29 to its operative positions the control relay 45 remains in its closed position provided the fourth position is not passed. In its closed position control relay 45 reestablishes the energizing circuit for the operating coil of the under-voltage relay 39 through its intermediate movable contact member $45_a$ and cooperating stationary contacts, segments 59, 51 and 41 of drum switch 29 and thence by way of conductors $59_a$, 58 to the middle supply line 14, thus serving to operate the under voltage relay 39 to its closed position and to reconnect the middle supply line 14 to the power segment 41 through the lower contacts 40 of the under-voltage relay 39.

The operation of the motor 10 may now be continued beyond the nearly open limit by operating the drum switch 29 through its successive operating positions to release the brake, connect the motor to the supply source 14, and short circuit the resistance sections 17 and 18 of the accelerating resistance. Due to the inclusion of the resistance sections 19–22 inclusive in the rotor circuit of the motor 10 the torque of the latter is greatly reduced and as a result it operates the bridge leaf to the final seated position at such a greatly reduced speed that the bridge leaf 11 is prevented from striking against the upper bumpers with any great force.

If the operator should attempt to operate the drum switch 29 beyond the fourth operative position which as shown is the third speed position of the controller, the segment 51 will be disengaged from its cooperating stationary finger and will thus interrupt the energizing circuit for the operating winding of the control relay 45 which will drop to its open position in response to the deenergization of its winding and in its open position this relay will interrupt the energizing circuit for the operating winding of the under-voltage relay 39 which will likewise drop to its open position to disconnect the power segment 41 from the middle supply line 14. As a result of this, the directional contactor 15 will be opened to disconnect the motor 10 from the supply source and the brake contactor 28 will be deenergized and set to stop the motor. Thus, it will be seen that operation of the motor 10 to move the bridge leaf 11 to its final or seated position at slow speed is insured. A signal lamp which is no part of the present invention may be employed to warn the operator to operate the drum switch 29 to its off position as the bridge leaf 11 is seated in its fully opened position or another segment may be included on switch 34 to remove power in the fully open position.

The closing operation of the bridge which will now be described is similar to the opening operation. To lower the bridge the drum switch 29 is operated in a right hand direction as indicated by the arrow through its successive operating positions. In the off position of the drum switch 29 the special control relay 45 and the under-voltage relay 39 are energized and operated to the closed position in the manner previously described in connection with the description of the opening operation except that the energizing circuit for relay 39 is now completed through segment 38, conductor 44, segments 65 and 41. On the first left hand point of the controller 29 the braking contactor 28 is energized over a circuit extending from the power segments 41 through left hand segment 32 and its cooperating stationary finger, through the operating winding and thence to the lower supply line 14 as previously traced. The brake 27 is released in response to the operation of the brake contactor. On the second left hand power point of the drum switch 29, an energizing circuit is established for the operating winding of the directional contactor 16, which circuit may be traced from the power segment 41, segment 31, operating coil of directional contactor 16 and thence by way of conductors 60 and 61 to the lower supply line 14. In response to the energization of its coil contactor 16 is operated to the closed position and connects the motor 10 to the supply source 14 for rotation in such a direction as to move the bridge leaf 11 from its open toward its closed position. On the successive points of the drum switch 29 in the lowering direction, the operating coils of the accelerating contactors 23-26 inclusive are energized and the accelerating resistances short-circuited to increase the speed of the motor to full speed in a manner that is identical with that previously described in connection with the opening operation of the bridge leaf with the exception that the energizing circuit for the accelerating contactors are established by the left-hand segments 33 of the drum switch 29 instead of by the right-hand segments 33 as previously described.

When the bridge leaf 11 reaches the nearly closed position the segment 38 of the limit switch mechanism 34 is disengaged from its cooperating stationary fingers and thus interrupts the energizing circuit of the under-voltage relay 39 which drops to its open position in response to the deenergization of its coil and in its open position the contact 40 disconnects the middle supply line 14 from the power segment 41 of the drum switch 29. As a result of this the directional contactor 16, the brake contactor 28 and the accelerating contactors 23-26 inclusive are deenergized and opened and the motor 10 is disconnected from the supply source 14 and the brake 27 is set to stop the motor.

As previously described in connection with the raising operation, the operation of the motor 10 to seat the bridge leaf 11 in its fully closed position can only be accomplished by first operating the drum switch 29 to the off position in which the energizing circuits for the operating coils of the directional contactor 16, the braking contactor 28 and the accelerating contactors 23-26 inclusive are further interrupted at the control segments of the drum switch 29. In the off position of the drum switch 29 the energizing circuit of the operating winding of the control relay 45 is reestablished to the single point segment 46 in response to which the relay moves to its closed position in which it establishes the holding circuit through its upper contacts, the conductor 49, segment 48 of the limit switch mechanism 34, conductor 50, segments 51, 41 of drum switch 29, conductor 46$_a$, lower contacts of relay 45 and thence by way of conductors 59$_a$ and 58 to the middle supply line 14. Relay 45 in closing reestablishes an energizing circuit for the under-voltage relay 39 through its second upper contact and the segments 65, 51, 41 and thence by conductors 46$_a$, 59$_a$ and 58 to the middle supply line 14. The undervoltage relay 39 recloses in response to the energization of its operating winding and reconnects the middle supply line 14 with the main power segment 41 of the drum switch 29.

Upon subsequent operation of the drum switch 29 to not beyond the fourth controlling position which is its third speed position, the brake 27 is again released and the motor 10 connected to the supply source with the resistance sections 20-22 inclusive included in the rotor circuit thereof so that the motor operates at very greatly reduced speed to seat the bridge leaf 11 in its final closed position in which it is illustrated in Fig. 2 of the drawing.

As previously described in connection with the description of the operation of seating the bridge in the open position, if the operator moves the drum switch 29 beyond its forth control position which is its third speed position, the control relay 45 and the under-voltage relay 39 will be deenergized and opened as a result of which the power segment 41 of the drum switch will be disconnected from the middle supply line 14 and the directional contactor 16 and brake contactor 28 will both be deenergized to disconnect the motor from the supply source 14 and to set the brake and stop the motor.

Thus, it will be seen that although the limit switch mechanism 34 serves to stop the motor 10 at both the nearly open and nearly closed position of the bridge leaf 11 and provision is made for operating the motor beyond these limits to set the bridge in either position by operation of the manually operated drum switch 29, nevertheless the motor 10 can not be operated beyond these limits without first operating the drum switch 29 to the off position in which the motor 10 is disconnected from the supply source 14 and the brake 27 is set to stop the motor. It will also be appreciated that the final seating operation of the bridge can only take place at a greatly decreased speed since if the drum switch 29 is moved beyond a predetermined position to increase the speed of the motor beyond a predetermined low value, the motor 10 will again be disconnected from the supply source and stopped. Consequently, the bridge leaf 11 is seated in either of its final positions at such a reduced speed that the leaf 11 does not engage buffers with any great force, thus eliminating shocks to the structure and the setting up of stresses in the members thereof.

Although, in accordance with the provisions of the patent statutes, I have described this invention as embodied in specific apparatus, I would have it understood that the apparatus and connections shown in the drawing and described in the above specification are merely illustrative and that the invention is not limited thereto, since alterations and modifications will readily suggest themselves to persons skilled in the art without departing from the true spirit of the invention or the scope of the annexed claims.

What I claim as new and desire to secure by Letters Patent of the United States, is:

1. In a motor control system, the combination with an electric motor, of control means for connecting said motor to a supply source and disconnecting said motor therefrom, means for stopping said motor at a predetermined limit of operation, means for continuing the operation of said motor beyond said limit, and means insuring the disconnection of said motor from said source prior to the operation beyond said limit.

2. In a motor control system, the combination with a reversible electric motor of a control device operable to connect said motor to a supply source for rotation in either direction, limit switch means for stopping said motor at predetermined limits of operation in each direction, means for continuing the operation of said motor beyond said limits in each direction, and means insuring the operation of said control device to disconnect said motor from said source prior to operation of said motor beyond said limits.

3. In a motor control system, the combination with a reversible electric motor, of a control device for connecting said motor to a supply source for rotation in opposite directions and operable to an off position for disconnecting said motor therefrom, limit switch mechanism for stopping said motor at predetermined limits of operation in each direction, and means responsive to said disconnecting operation and only in said off position of said control device for rendering said limit switch mechanism ineffective.

4. In a motor control system, the combination with an electric motor, of a device for limiting the motor current, means for connecting said motor to a source of supply and for rendering said current limiting device ineffective, means for stopping said motor after a predetermined limit of operation, means for rendering said current limiting device effective, means for rendering said limit stopping means ineffective, thereby to provide low speed operation of said motor beyond said limit, and means insuring the disconnection of said motor from said source prior to operation of said motor beyond said limit.

5. In a motor control system the combination with an electric motor and a current limiting device therefor, of a control device operable to connect said motor to a supply source and to render said current limiting device ineffective and also operable to disconnect said motor from said supply source, means for stopping said motor at a predetermined limit of operation and for rendering said current limiting device effective, and means requiring the operation of said control device to disconnect said motor from said source in order to render said limit stop means ineffective and thereby provide for slow speed operation of said motor beyond said limit.

6. In a motor control system, the combination with an electric motor, and a current limiting resistance therefor, of a control device having an off position and operable to a controlling position, means responsive to operation of said device to said controlling position to connect said motor to a supply source and responsive in said off position to disconnect said motor from said source, limit switch mechanism for stopping said motor at a predetermined limit of operation and for rendering said resistance effective, and means responsive to operation of said control device to said off position for rendering said limit switch mechanism ineffective to maintain said motor stopped, thereby to provide for slow speed operation of said motor beyond said limit upon subsequent operation of said control device to said controlling position.

7. In a motor control system, the combination with an electric motor and a current limiting resistance therefor, of a master controller operable to connect and disconnect said motor and a supply source to start and stop said motor, limit switch mechanism for stopping said motor at a predetermined limit of operation, electrical connections controlled by an operation of said controller for connecting said motor with said resistance in circuit therewith to said source to provide low speed operation of said motor beyond said limit, and electrical connections for preventing the operation of said motor beyond said limit prior to operation of said controller to disconnect said motor from said source to stop said motor.

8. In a motor control system the combination with a reversible electric motor and a current limiting resistance therefor, of a master controller operable to connect said motor to a supply source for rotation in either direction and operable to disconnect said motor from said source to stop said motor, limit switch mechanism for stopping said motor at predetermined limits of operation in each direction, electrical connections controlled by said controller for connecting said motor with said resistance in circuit therewith to said source to provide low speed operation of said motor beyond said limit in either direction, and electrical connections jointly controlled by said limit switch mechanism and said controller for preventing operation of said motor beyond said limit prior to operation of said controller to disconnect and stop said motor.

9. In a motor control system the combination with an electric motor and a current limiting resistance therefor, of a master controller for connecting and disconnecting said motor and a supply source to start and stop said motor, limit switch mechanism for stopping said motor at a predetermined limit of operation, an electroresponsive device and connections controlled thereby for connecting said motor with said resistance in circuit therewith to said supply source to provide low speed operation of said motor beyond said limit, and electrical connections controlled by said controller for preventing operation of said electro-responsive device to effect operation of said motor beyond said limit prior to operation of said controller to disconnect said motor from said source to stop said motor.

10. In a motor control system, the combination with a reversible electric motor and a current limiting resistance therefor, of a master controller operable to connect said motor to a supply source for rotation in either direction and operable to disconnect said motor from said source to stop said motor, limit switch mechanism for stopping said motor at predetermined limits of operation in each direction, an electroresponsive device jointly controlled by said limit switch mechanism and said controller and electrical connections controlled by said device to connect said motor with said resistance in circuit therewith to said source to provide for low speed operation of said motor beyond said limits, and electrical connections controlled by said controller for preventing operation of said device to effect operation of said motor beyond said limits prior to operation of said controller to disconnect said motor from said source to stop said motor.

11. In a motor control system, the combination with an electric motor and a current limiting resistance therefor, electromagnetic switching mechanism for connecting and disconnecting said motor and a supply source, energizing circuits for said switching mechanism, a master controller for controlling said circuits to start and stop said motor, limit switch mechanism for deenergizing said circuits to stop said motor at a predetermined limit of operation, an electroresponsive device responsive to said motor stopping operation of said controller for partially reestablishing said circuits thereby to provide for connection of said motor with said resistance in circuit therewith to said source to provide for low speed operation of said motor beyond said limit upon subsequent operation of said controller to complete said circuits.

12. In a motor control system, the combination with an electric motor and a current limiting resistance therefor, of a master controller for connecting and disconnecting said motor and a supply source to start and stop said motor and for controlling the inclusion of said resistance in circuit with said motor, limit switch mechanism for stopping said motor at a predetermined limit of operation, an electroresponsive relay controlled by said controller and connections controlled by said relay for connecting said motor with a predetermined portion of said resistance in circuit therewith to said source to effect slow speed operation of said motor beyond said limit and electrical connections controlled by said controller providing for operation of said relay to continue operation of said motor only in response to prior operation of said controller to disconnect said motor from said source to stop said motor.

13. In a motor control system the combination with an electric motor and a current limiting resistance therefor, of electromagnetic switching mechanism for connecting and disconnecting motor and a supply source, a plurality of electromagnetic switching devices for controlling said resistance, energizing circuits for said switching mechanism and said switching devices, a master controller for controlling said circuits to start and stop said motor, limit switch mechanism for interrupting said circuits to stop said motor at a predetermined limit of operation, a relay responsive to said motor stopping operation of said controller for partially reestablishing said circuits to connect said motor with said resistance in circuit therewith to said source to provide operation of said motor beyond said limit in response to a subsequent operation of said controller to complete said circuits, and a segment on said controller providing for completion of only a portion of the energizing circuits for said switching devices thereby to insure low speed operation of said motor beyond said limit.

14. In a motor control system, the combination with a reversible electric motor and a current limiting resistance connected in circuit therewith, of electromagnetic switching mechanism for connecting said motor to a supply source for rotation in either direction, a plurality of electromagnetic switching devices for controlling said resistance, energizing circuits for said switching mechanism and devices, a master controller for controlling said circuits to start and stop said motor, limit switch mechanism for interrupting said circuits to stop said motor at predetermined limits of operation in each direction, a relay operable in response to the motor stopping operation of said controller to partially re-establish said circuits thereby to provide for connection of said motor with said resistance in circuit therewith to said source in response to a subsequent operation of said controller to complete said circuits, segments on said limit switch for establishing a locking circuit for said relay during said subsequent operation, and a segment on said controller for interrupting said locking circuit in response to operation of said controller to complete the energizing circuits for more than a predetermined portion of said switching devices thereby to insure slow speed operation of said motor beyond said limits.

In witness whereof, I have hereunto set my hand.

JOSEPH A. SETTER.